(12) United States Patent
Tanaka

(10) Patent No.: US 9,199,515 B2
(45) Date of Patent: Dec. 1, 2015

(54) RUN-FLAT TIRE

(71) Applicant: SUMITOMO RUBBER INDUSTRIES, LTD., Kobe-shi, Hyogo (JP)

(72) Inventor: Susumu Tanaka, Kobe (JP)

(73) Assignee: SUMITOMO RUBBER INDUSTRIES LTD., Kobe-Shi (JP)

( * ) Notice: Subject to any disclaimer, the term of this patent is extended or adjusted under 35 U.S.C. 154(b) by 445 days.

(21) Appl. No.: 13/660,009

(22) Filed: Oct. 25, 2012

(65) Prior Publication Data

US 2013/0118661 A1 May 16, 2013

(30) Foreign Application Priority Data

Nov. 15, 2011 (JP) ................................ 2011-249947

(51) Int. Cl.
| | | |
|---|---|---|
| *B60C 11/117* | (2006.01) | |
| *B60C 11/12* | (2006.01) | |
| *B60C 11/03* | (2006.01) | |
| *B60C 17/00* | (2006.01) | |
| *B60C 11/13* | (2006.01) | |

(52) U.S. Cl.
CPC ........... *B60C 11/0304* (2013.04); *B60C 11/032* (2013.04); *B60C 11/1236* (2013.04); *B60C 17/00* (2013.04); *B60C 11/1369* (2013.04); *B60C 2011/0341* (2013.04); *B60C 2011/0348* (2013.04); *B60C 2011/0353* (2013.04); *B60C 2011/0376* (2013.04); *B60C 2011/0381* (2013.04); *B60C 2011/0388* (2013.04)

(58) Field of Classification Search
CPC   B60C 11/0304; B60C 11/0306; B60C 11/11; B60C 11/1236; B60C 11/032; B60C 2011/0381

See application file for complete search history.

(56) References Cited

U.S. PATENT DOCUMENTS

| | | | | |
|---|---|---|---|---|
| 5,291,929 A | * | 3/1994 | Daisho et al. ............ | 152/209.28 |
| 6,026,878 A | * | 2/2000 | Zhang et al. .................. | 152/454 |
| 6,105,644 A | * | 8/2000 | Ikeda .......................... | 152/209.8 |
| 8,511,358 B2 | * | 8/2013 | Murata ....................... | 152/209.8 |
| 2005/0121123 A1 | * | 6/2005 | Nakagawa ................. | 152/209.9 |

FOREIGN PATENT DOCUMENTS

| | | | |
|---|---|---|---|
| DE | 102010000210 | * | 7/2011 |
| JP | 2004-74914 A | | 3/2004 |
| JP | 2008-049966 | * | 3/2008 |
| JP | 2009-040156 | * | 2/2009 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A run-flat tire comprises a tread portion having a left-right asymmetry tread pattern including an inboard tread edge and an outboard tread edge defining a tread width therebetween, a circumferentially extending inner crown main groove disposed in an inner crown area being 20% width of the tread width from a tire equator toward the in-board tread edge, a plurality of inner lateral grooves extending from the inner crown main groove to the in-board tread edge, a plurality of inner blocks separated by the inner crown main groove, inner lateral grooves and the inboard tread edge, wherein each inner block is not provided with any circumferential grooves, or is provided with at least one narrow circumferential groove having a groove width of less than 2.0 mm.

9 Claims, 4 Drawing Sheets

RUN-FLAT TIRE

BACKGROUND OF THE INVENTION

1. Field of the Invention

The present invention relates to a run-flat tire in which run-flat durability can be improved while maintaining the ride comfort and drainage performance.

2. Description of the Related Art

In recent years, a run-flat tire with a pair of reinforced sidewall portions is well known. Typically, such a run-flat tire is provided with a reinforcing rubber layer with a crescent shape in each sidewall portion. In order to improve durability of the run-flat tire, it is proposed to increase rigidity of the reinforcing rubber layer so as to reduce the tire flexure during run-flat running.

Generally, when the run-flat tire is being installed in a vehicle, an inboard sidewall portion thereof is difficult to obtain cooling effect during running compared to the outboard sidewall portion which faces on a street side. Accordingly, the reinforcing rubber layer disposed in the inboard sidewall portion of the tire tends to soften in the heat generation, and thereby the run-flat tire tends to be damaged in the inboard portion due to the large tire flexure in the inboard sidewall portion.

In order to prevent the large tire flexure in the run-flat tire during run-flat running, reinforcing rubber layers with still higher rigidity may be employed in sidewall portions. However, such a run-flat tire tends to deteriorate ride comfort.

It is an object of the present invention to provide a run-flat tire in which run-flat durability can be improved while maintaining the ride comfort as well as drainage performance.

SUMMARY OF THE INVENTION

In accordance with the present invention, there is provided a run-flat tire comprising a tread portion having a left-right asymmetry tread pattern including an inboard tread edge and an outboard tread edge defining a tread width therebetween, a circumferentially extending inner crown main groove disposed in an inner crown area being 20% width of the tread width from a tire equator toward the in-board tread edge, a plurality of inner lateral grooves extending from the inner crown main groove to the in-board tread edge, a plurality of inner blocks separated by the inner crown main groove, inner lateral grooves and the inboard tread edge, wherein each inner block is not provided with any circumferential grooves, or is provided with at least one narrow circumferential groove having a groove width of less than 2.0 mm.

DETAILED DESCRIPTION

An embodiment of the present invention will be explained below with reference to the accompanying drawings.

Figure 1:
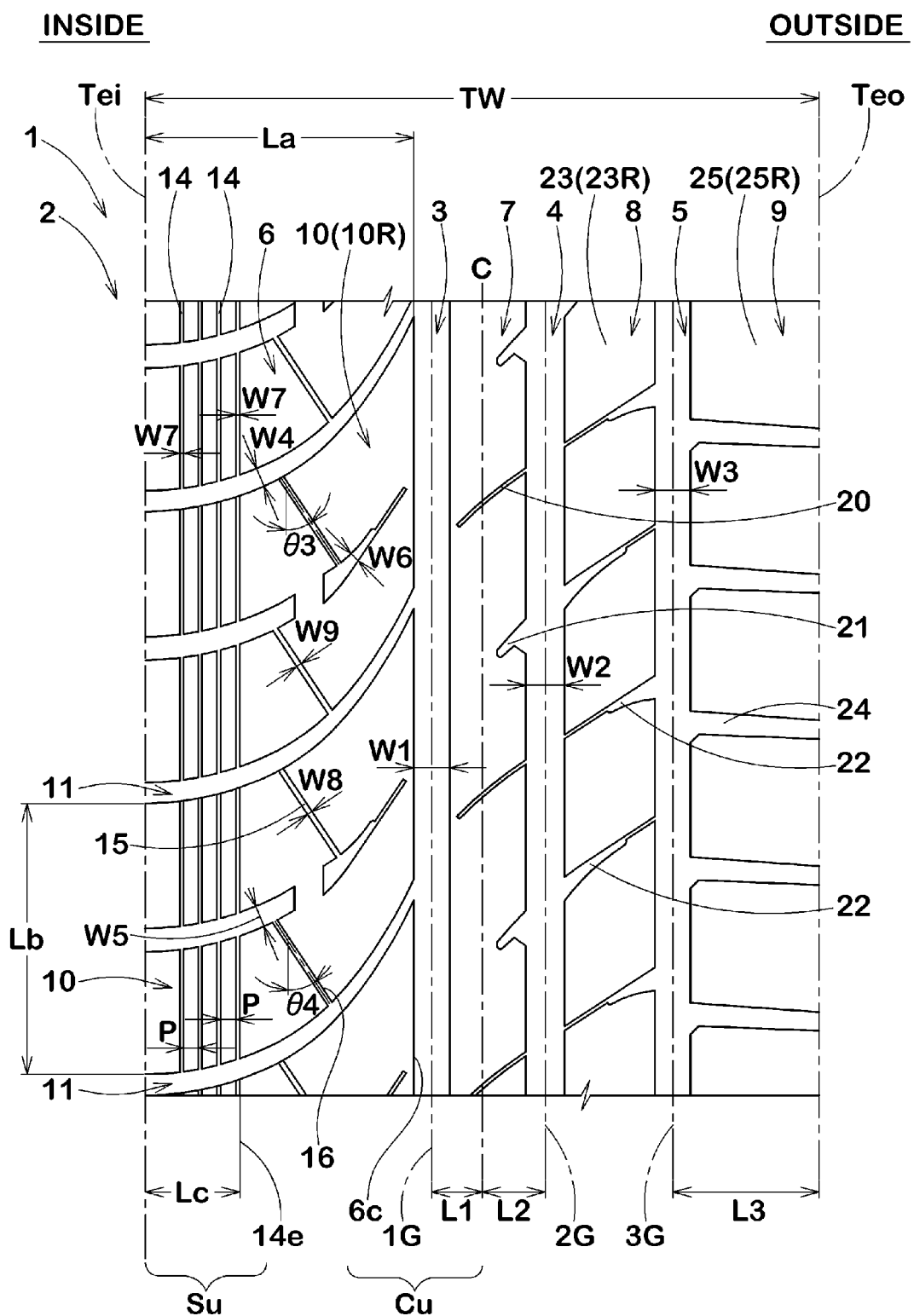
FIG. 1 is a development view of a tread portion of a run-flat tire showing an embodiment of the present invention.
Figure 2:
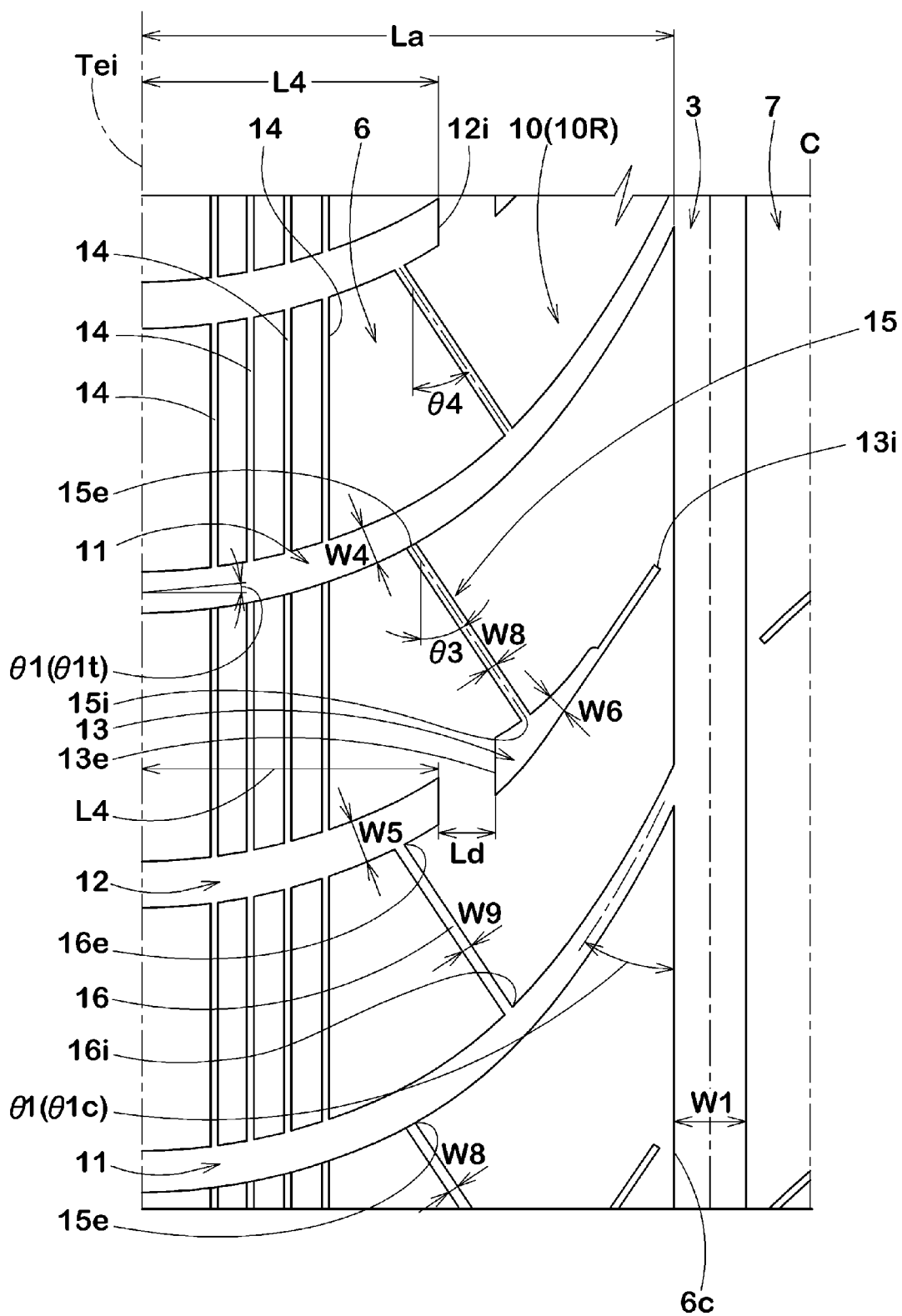
FIG. 2 is a partial enlarged view of an inboard of the tread portion in FIG. 1.

As shown in FIG. 1 and FIG. 2, a run-flat tire 1 (hereinafter it may be referred simply as "tire") in accordance with the present invention is suitably used for passenger cars, which includes a tread portion with a left-right asymmetry tread pattern including an inboard tread edge Tei and an outboard tread edge Teo defining a tread width TW therebetween. The tire 1 is provided with an indication (not shown) on the sidewall portion for which identifies its install direction to a vehicle, for example.

The tire 1 in accordance with the present invention has a reinforcing rubber layer with a crescent shape being provided in each sidewall portion, although it is not shown.

In this embodiment, the tread portion 2 of the tire is provided with: an inner crown main groove 3 which is disposed in the side of the inboard tread edge Tei than the tire equator C and extends continuously in the circumferential direction of the tire; an outer crown main groove 4 which is disposed in the side of the outboard tread edge Teo than the tire equator C and extends continuously in the circumferential direction of the tire; and an outer shoulder main groove 5 which is disposed in the side of the outboard tread edge Teo than the outer crown main groove 4.

Hence, the tread portion 2 includes: an inner shoulder land portion 6 between the inner crown main groove 3 and the inboard tread edge Tei; a crown land portion 7 between the inner crown main groove 3 and the outer crown main groove 4; an outer middle land portion 8 between the outer crown main groove 4 and the outer shoulder main groove 5; and the outer shoulder main groove 5 and the outboard tread edge Teo.

The inboard tread edge Tei refers to one of the two tread edges which is intended to be positioned towards the center of the vehicle body. The outboard tread edge Teo refers to the other tread edge which is intended to be positioned away from the center of the vehicle body. According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

The tread edges are the axial outermost edges of the ground contacting patch which occurs under the normally inflated loaded condition when the camber angle of the tire is zero.

The tread width TW is the width measured under the normally inflated unloaded condition, as the axial distance between the tread edges Tei and Teo determined as above. In this application including specification and claims, various dimensions, positions and the like of the tire refer to those under a normally inflated unloaded condition of the tire unless otherwise noted.

The normally inflated unloaded condition is such that the tire is mounted on a standard wheel rim and is inflated to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard load is the "maximum load capacity" in JATMA, the "Load capacity" in ETRTO, and the maximum value given in the above-mentioned table in TRA or the like.

In case of passenger car tires, however, the standard pressure and standard tire load are uniformly defined by 180 kPa and 88% of the maximum ti re load, respectively.

Each of the inner crown main groove 3, the outer crown main groove 4 and the outer shoulder main groove 5 is formed as a straight groove extending along the circumferential direction of the tire. Such main grooves 3, 4 and 5 can smoothly drain water backward, and thereby the drainage performance of the ti re may be improved.

The inner crown main groove 3 is disposed in an inner crown area Cu being 20% width of the tread width TW from the tire equator C toward the in-board tread edge Tei. Namely, an entire inner crown main groove 3 is provided within the inner crown area Cu. In case that the inner crown main groove 3 is disposed in the side of the inboard tread edge Tei than the inner crown area Cu, it may be difficult to drain water under the tire equator C and thereby the drainage performance tends to deteriorate. On the other hand, if the inner crown main groove 3 is provided close to the tire equator C, the inner shoulder land portion 6 tends to have a large width, and thereby drainage performance tends to deteriorate. Accordingly, the axial distance L1 between the groove centerline 1G of the inner crown main groove 3 and the tire equator C is preferably not less than 5%, more preferably not less than 7%, preferably not more than 15%, and more preferably not more than 13% of the tread width TW.

In order to further improve the drainage performance as well as pattern rigidity of the tread portion, the axial distance L2 between the groove centerline 2G of the outer crown main groove 4 and the tire equator C is preferably in a range of from 6.0 to 12.0% of the tread width TW. Similarly, the axial distance L3 between the groove centerline 3G of the outer shoulder main groove 5 and the outboard tread edge Teo is preferably in a range of from 18.0 to 25.0% of the tread width TW.

In order to further improve the drainage performance as well as pattern rigidity of the tread portion, the groove width W1 of the inner crown main groove 3 is preferably in a range of from 3.0 to 7.0% of the tread width TW. similarly, the groove width W2 of the outer crown main groove 4 is preferably in a range of from 3.5 to 7.5% of the tread width TW. similarly, the groove width W3 of the outer shoulder main groove 5 is preferably in a range of from 3.0 to 7.0% of the tread width TW. Here, a groove width described in this application is measured in the right angle direction with respect to a longitudinal direction of the groove. In the same way, groove depths of each main groove 3, 4 and 5 are preferably in a range of from 5.0 to 10.0 mm.

The tread portion 2 is provided with a plurality of inner lateral grooves 11 which extend from the inner crown main groove 3 to the inboard tread edge Tei. In this embodiment, each inner lateral groove 11 extends beyond the inboard edge Tei. Accordingly, inner shoulder land portion 6 is formed as a block row 10R with a plurality of circumferentially arranged inner blocks 10 separated by inner lateral grooves 11. Such inner lateral grooves 11 are able to drain water in the inner crown main groove 3 as well as water film between the inner shoulder land portion 6 and road.

Each inner lateral groove 11 is inclined toward one side with respect to the circumferential direction of the tire. The inner lateral groove 11 has an inclination angle $\theta 1$ with respect to the circumferential direction of the tire gradually increased toward the inboard tread edge Tei. Such inner lateral grooves 11 are effectively and smoothly able to drain water from the inboard tread edge Tei to the outside of the tire using contacting pressure with road. Also, since inner lateral grooves 11 have large inclination angles near the inboard tread edge Tei, the rigidity of axially outside of the inner shoulder land portion 6 is increase, and thereby the tire flexure during run-flat running may be reduced. In view of above, the inclination angle $\theta 1c$ of the inner lateral groove 11 at the inner crown main groove 3 is preferably in a range of from 15 to 30 degrees, and the inclination angle $\theta 1t$ of the inner lateral groove 11 at the inboard tread edge Tei is preferably in a range of from 70 to 85 degrees.

In this embodiment, the groove width W4 of the inner lateral groove 11 is gradually increased toward or to the inboard tread edge Tei from the inner crown main groove 3 so as to improve drainage performance of the tire. In order to improve the rigidity of inner blocks 10 as well as the drainage performance, groove widths W4 of inner lateral grooves 11 are preferably in a range of from 3 to 15% of the axial width La of inner blocks 10. Similarly, groove depths (not shown) of inner lateral grooves 11 are preferably 3.0 to 8.0 mm.

Figure 3:
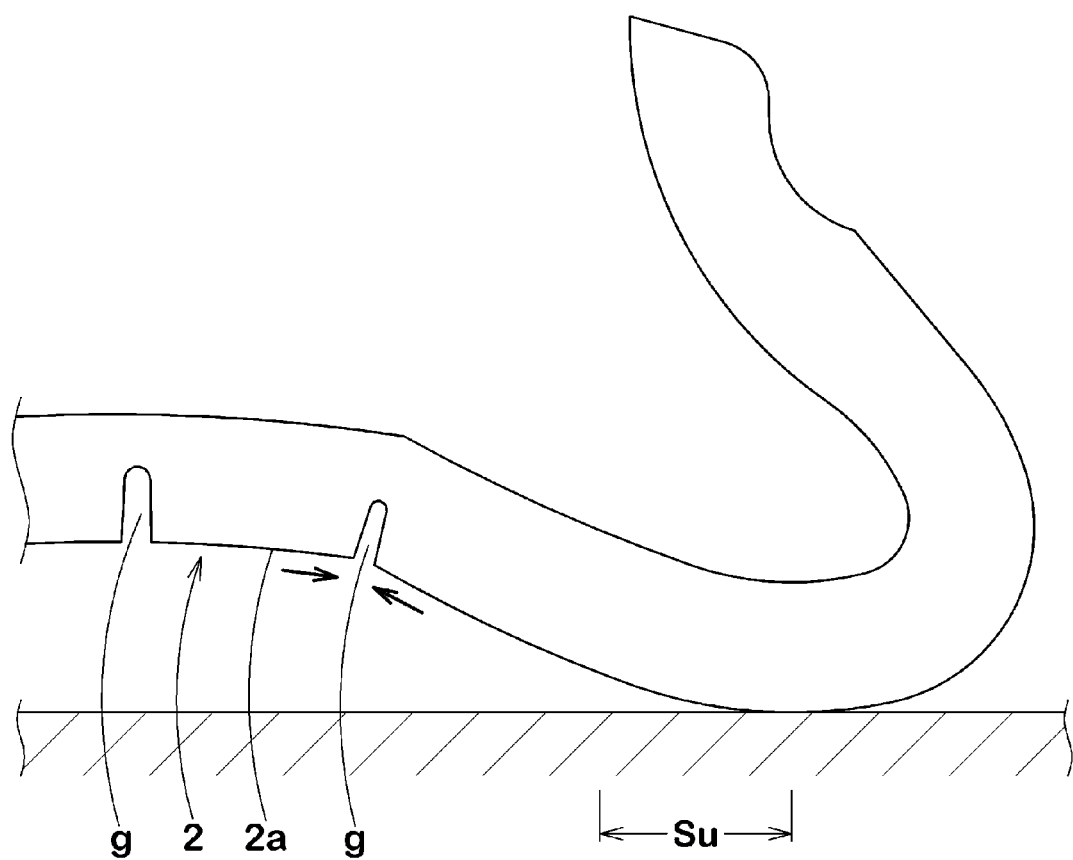
FIG. 3 is a part of cross sectional view of a run-flat tire under run-flat state.

The run-flat tire 1 in accordance with the present invention, each inner block 10 is not provided with any circumferential grooves, or each inner block 10 is provided with a narrow circumferential groove 14 with a groove width W7 of less than 2.0 mm. FIG. 3 shows a run-flat tire during run-flat running. Generally, when the tire goes on run-flat running, buckling may be caused on the tread portion 2 due to circumferential grooves (g). On the other hand, each inner block 11 of the tread portion 2 has a large axial width La and has no circumferential groove, or has only the narrow groove 14 thereon as to the circumferential groove. Accordingly, the tire 1 in accordance with the present invention makes possible to prevent buckling on the inboard side of the tread portion 2 and to employ the reinforcing rubber layer with less rigidity in the sidewall portion to maintain the ride comfort.

In this embodiment as shown in FIGS. 1 and 2, each inner block 11 is provided with a plurality of narrow circumferential grooves 14 (four grooves in this specified embodiment) with groove widths W7 of not more than 1.5 mm. Such narrow circumferential grooves 14 with small groove widths may prevent buckling from there while improving the drainage performance. In order to improve the effect described above, groove widths W7 of narrow circumferential grooves 14 may be preferably set in a range of from 0.5 to 1.2 mm.

Narrow circumferential grooves 14 are preferably disposed in an inner shoulder region su with an axial width of not more than 18% of the tread width TW from the inboard tread edge Tei. As shown in FIG. 3, since the inner shoulder region su is usually generated tensile stress, buckling is further prevented while suitably softening the rigidity of each inner block 10. Accordingly, the tire 1 in accordance with the present invention can be improved the run-flat durability while maintaining the ride comfort and drainage performance. Especially, the axial distance Lc between the inboard tread edge Tei and the innermost groove edge of narrow circumferential groove 14 is preferably in a range of from 8 to 15% of the tread width TW.

As shown in FIGS. 1 and 2, narrow circumferential grooves 14 in this embodiment extend in straight along the circumferential direction of the tire to improve drainage performance.

Groove depths of narrow circumferential grooves 14 (not shown) are preferably set in a range of from 1.0 to 6.0 mm to improve drainage performance as well as to reduce tire flexure during run-flat running. Similarly, a pitch P between narrow circumferential grooves 14 is preferably in a range of from 3.0 to 20 mm.

Each inner block 10 is provided with a sub lateral groove 12 which extends from the inboard tread edge Tei toward the inner crown main groove 3 in parallel with inner lateral grooves 11. The sub lateral groove 12 has an axially inner end 12i which terminates within the inner block 10. Such the sub lateral groove 12 serves to improve the drainage performance while maintaining the rigidity of each inner block so as to reduce tire flexure during run-flat running.

The axially inner end 12i of the sub lateral groove 12 is located axially inside than the inner shoulder region su to improve the drainage performance. When the axially inner end 12i of the sub-lateral groove 12 is provided close to the inner crown main groove 3, rigidity of inner blocks 10 tends to small, and thereby tire flexure during run-flat running tends to increase. Accordingly, the axial distance L4 between the inboard tread edge Tei and the axially inner end 12i of the sub lateral groove 12 is preferably in a range of from 40 to 70% of the axial width La of the inner block 10.

In order to effectively achieve the effect above, groove width W5 of the sub lateral groove 12 is preferably set in a range of from 3 to 15% of the axial width La of the inner block 10. In this embodiment, the groove width W5 of the sub lateral groove 12 is gradually increasing toward the inboard tread edge Tei like inner lateral grooves 11. The groove depth of the sub lateral groove 12 (not shown) is preferably set in a range of from 1.5 to 8.0 mm.

The sub lateral groove 12 in this embodiment is preferably disposed in the center region of each inner block 10 in the circumferential direction of the tire to improve drainage performance while maintaining the run-flat durability. The center region of the inner block 10 has a circumferential length in a range of from 40 to 60% of the circumferential length Lb of the inner block 10.

Each inner block 10 is provided with a slit 13 which has an axially outer end 13e being separated from the inner end 12i of the sub lateral groove 12. The axially outer end 13e is located facing to the inner end 12i of the sub lateral groove 12. The slit 13 extends in parallel with inner lateral grooves 12 from the axially outer end 13e to an axially inner end 13i which terminates within the inner block 10. The slit 13 serves to further improve the drainage performance and run-flat durability of the tire 1.

In order to achieve the effect above, the axial distance between the axially outer end 13e of the slit 13 and the axially inner end 12i of the sub lateral groove 12 is preferably set in a range of from 5 to 15% of the axial width La of the inner block 10.

Moreover, the slit 13 preferably has a width W6 gradually reducing toward the inner crown main groove 3. Namely, the width W6 of the slit 13 is gradually increasing toward the inboard tread edge Tei. The width W6 is preferably in a range of from 0.5 to 10. mm.

Each inner block 10 is provided with a first inclined groove 15 and a second inclined groove 16.

The first inclined groove 15 has an axially outer end 15e and an axially inner end 15i. The axially outer end 15e of the first inclined groove 15 is connected to one of lateral grooves 11. The axially inner end 15i of the first inclined groove 15 is connected to the slit 13. Accordingly, the first inclined groove 15 can drain water in the slit 13 through the lateral groove 11 to the inboard tread edge Tei.

The second inclined groove 16 has an axially outer end 16e and an axially inner end 16i. The axially outer end 16e of the second inclined groove 16 is connected to the sub lateral groove 12. The axially inner end 16i of the second inclined groove 16 is connected to the other of lateral grooves 11. Accordingly, the second inclined groove 16 can drain water in the lateral groove 11 as well as the sub lateral groove 12 to the inboard tread edge Tei.

In order to achieve the effect above, the axially inner end 15i of the first inclined groove 15 is preferably connected close to the axially outer end 13e of the slit 13. Similarly, the axially outer end 16e of the second inclined groove 16 is preferably connected close to the axially inner end 12i of the sub lateral groove 12. From this point of view, the first and second inclined grooves 15 and 16 are preferably located axially inside than the inner shoulder region Su.

The first inclined groove 15 extends from the axially outer end 15e to the inner end 15i toward the tire equator C. The first inclined groove 15 has an inclination angle θ3 of from 30 to 60 degrees with respect to the circumferential direction of the tire. Also, the second inclined groove 16 extends from the axially outer end 16e to the inner end 16i toward the tire equator C. The second inclined groove 16 has an inclination angle θ4 of from 30 to 60 degrees with respect to the circumferential direction of the tire. If inclination angles θ3 and θ4 are too small, buckling due to first and/or second inclined grooves 15 and 16 may be caused on the tread portion 2. On the other hand, if the angles θ3 and θ4 are too large, drainage performance tends to deteriorate. Accordingly, inclination angles θ3 and θ4 are preferably in a range of from 35 to 55 degrees. The first inclined groove 15 and the second inclined groove 16 preferably extend in parallel each other.

In the same way, groove widths W8 and W9 of the first inclined groove 15 and the second inclined groove 16 are preferably in a range of 0.5 to 2.5 mm, and groove depths of the first and second inclined grooves 15 and 16 are preferably in a range of from 1.5 to 7.0 mm.

The crown land portion 7 is formed as a rib which continuously extends in the circumferential direction of the tire. The crown land portion 7 is provided with narrow crown lateral grooves 20 and slots 21. Each narrow crown lateral groove 20 extends from the outer crown main groove 4 beyond the tire equator C without reaching the crown main groove 3. Each slot 21 extends from the outer crown main groove 4 toward the inner crown main groove 3 without reaching the tire equator C.

The outer middle land portion 8 is provided with a plurality of middle lateral grooves 22 which connect between the outer crown main groove 4 and the outer shoulder main groove 5 so as to form an outer middle block row 23R which includes a plurality of outer middle blocks 23.

The outer shoulder land portion 9 is provided with a plurality of shoulder lateral grooves 24 which connect between the outer shoulder main groove 5 and the outboard tread edge Teo so as to form an outer shoulder block row 25R which includes a plurality of outer shoulder blocks 25. Accordingly, such the out board side of the tread portion 2 between the tire equator C and the outboard tread edge Teo serves to improve the drainage performance. However, the crown land portion 7, the outer middle land portion 8 and the outer shoulder land portion 9 are not particularly limited to the embodiment described above, various tread patterns may be employed.

The present invention is more specifically described and explained by means of the following Examples and References. It is to be understood that the present invention is not limited to these Examples.

Comparison Test

Run-flat tires of size 225/55R17 with identical internal structures including reinforcing rubber layers disposed in each sidewall portion except for details shown in Table 1 were made, and then run-flat durability, drainage performance and ride comfort were tested. Major common specifics and test method are as follows.

Tread width TW: 183 mm
Groove depth of inner crown main groove: 8.0 mm
Groove width of inner crown main groove W1/TW: 5.5%
Groove Depth of outer shoulder main groove: 7.7 mm
Groove Depth of outer crown main groove: 8.0 mm
Groove Depth of inner lateral groove: 6.5 mm
Groove Depth of inner sub lateral groove: 6.5 mm
Depth of slit: 6.5 mm
Groove depth of narrow circumferential groove: 3.0 mm Ride Comfort Test:

The test tires were mounted on wheel rims of 17×7 JJ with an inner pressure of 230 kPa, and installed in a vehicle (Japanese FR car with a displacement of 3,500 cc) as rear wheels, the test driver drove the vehicle on dry asphalt road, and evaluated ride comfort such as damping, harshness and rigidity etc. The results are indicated in Table 1 by scores based on Ref. 1 being 6, wherein the larger the value, the better the ride comfort is. The maximum score is 10.

Drainage Performance Test:

The test vehicle described above was entered into a course with a water puddle 1.5 mm deep and 20 m long, on an asphalt road surface with a radius of 100 m, with stepwise speed increase. Then, lateral acceleration (lateral G) of the vehicle was measured, and average lateral G of the front wheels at speeds of 50 to 80 km/h was calculated. Calculation results are shown with an index of 100 representing a value in Ref. 1. Larger the values, the better the drainage performance is.

Run-Flat Durability Test:

The test vehicle described above was run on a dry asphalt oval test course with two corners of 150 m and 110 m radii, and a valve core of the wheel rim was removed from the one of rear test tires. The test car was continuously run at a speed of 80 km/hr with the rear camber angle of 2 degrees to measure a runable distance. The results are indicated in Table 1 by an index based on Ref. 1 being 100, wherein the larger the value, the better the Run-flat durability is.

TABLE 1-1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Ratio L1/TW (%) | 23 | 8 | 15 | 13 | 7 | 8 | 8 | 8 | 8 | 8 | 8 | 8 |
| Narrow groove width W7 (mm) | 1 | 1 | 1 | 1 | 1 | 0.3 | 0.5 | 1.2 | 1.5 | 1 | 1 | 1 |
| Axial distance Lc/TW (%) | 14 | 14 | 14 | 14 | 14 | 14 | 14 | 14 | 14 | 6 | 8 | 18 |
| Angles θ3, θ4 (degree) | 45 | 45 | 45 | 45 | 45 | 45 | 45 | 45 | 45 | 45 | 45 | 45 |
| Groove widths W8, W9 (mm) | 1.5 | 1.5 | 1.5 | 1.5 | 1.5 | 1.5 | 1.5 | 1.5 | 1.5 | 1.5 | 1.5 | 1.5 |
| Ride comfort (Score) | 6 | 7 | 7 | 7 | 7 | 6.5 | 6.5 | 7 | 7.2 | 6.5 | 7 | 7 |
| Run-flat durability (Index) | 100 | 120 | 110 | 115 | 120 | 120 | 120 | 120 | 109 | 120 | 120 | 110 |
| Drainage performance (Index) | 100 | 120 | 110 | 115 | 115 | 110 | 115 | 120 | 122 | 110 | 115 | 120 |

TABLE 1-2

Figure 4A:
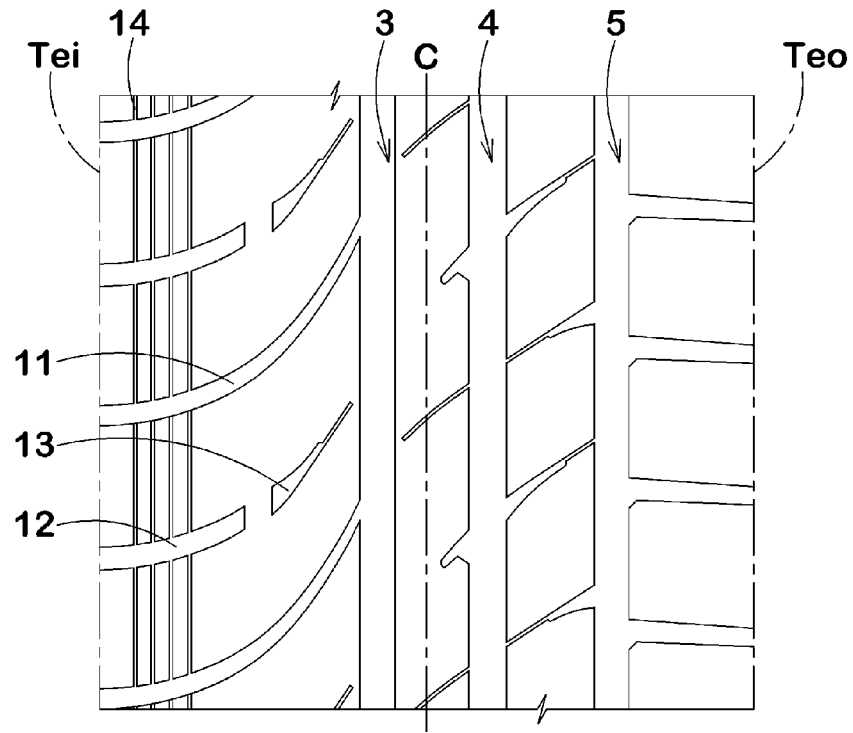
FIG. 4(a) is a development view of a tread portion of a run-flat tire showing another embodiment of the present invention.
Figure 4B:
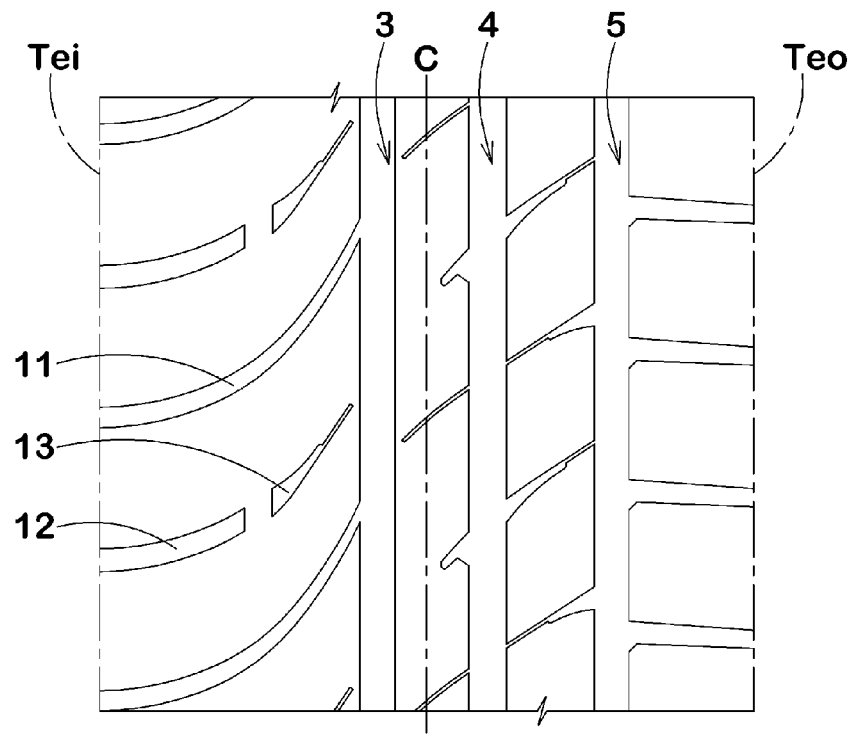
FIG. 4(b) is a development view of a tread portion of a run-flat tire showing still another embodiment of the present invention.

|  | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
| --- | --- | --- | --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 | FIG. 1 | FIG. 4a | FIG. 4b |
| Ratio L1/TW (%) | 8 | 8 | 8 | 8 | 8 | 8 | 8 | 8 | 8 | 8 | 8 |
| Narrow groove width W7 (mm) | 1 | 1 | 1 | 1 | 1 | 1 | 1 | 1 | 1 | 1 | — |
| Axial distance Lc/TW (%) | 20 | 14 | 14 | 14 | 14 | 14 | 14 | 14 | 14 | 14 | — |
| Angles θ3, θ4 (degree) | 45 | 25 | 30 | 60 | 65 | 45 | 45 | 45 | 45 | — | — |
| Groove widths W8, W9 (mm) | 1.5 | 1.5 | 1.5 | 1.5 | 1.5 | 0.7 | 1 | 2.5 | 2.7 | — | — |
| Ride comfort (Score) | 7 | 7 | 7 | 7 | 7 | 7 | 7 | 7 | 7 | 6.5 | 6 |
| Run-flat durability (Index) | 105 | 105 | 110 | 125 | 125 | 125 | 125 | 115 | 105 | 130 | 130 |
| Drainage performance (Index) | 120 | 130 | 125 | 115 | 105 | 107 | 110 | 125 | 130 | 110 | 100 |

From the test results, it was confirmed that performance of example tires in accordance with the present invention can be effectively improved compared to references. Although the same tests were made while changing the tire size, the same results were confirmed.

The invention claimed is:

1. A run-flat tire comprising
a tread portion having a left-right asymmetry tread pattern including an inboard tread edge and an outboard tread edge defining a tread width therebetween;
a circumferentially extending inner crown main groove disposed in an inner crown area being 20% width of the tread width from a tire equator toward the in-board tread edge;
a plurality of inner lateral grooves extending from the inner crown main groove to the in-board tread edge; and
a plurality of inner blocks separated by the inner crown main groove, inner lateral grooves and the inboard tread edge,
wherein
each inner block is not provided with any circumferential grooves,
each inner block is provided with a sub lateral groove and a slit, the sub lateral groove extending from the inboard tread edge in parallel with inner lateral grooves to an axially inner end terminating within the inner block,
the slit has an axially outer end separated from the inner end of the sub lateral groove,
the slit extends in parallel with inner lateral grooves from the axially outer end to an axially inner end terminating within the inner block, and
the slit has a width gradually reducing toward the inner crown main groove.

2. The tire according to claim 1, wherein
each inner block is provided with a first inclined groove,
the first inclined groove has an axially outer end and an axially inner end,
the axially outer end of the first inclined groove is connected to one of lateral grooves,
the axially inner end of the first inclined groove is connected to the slit, and
the first inclined groove has an inclination angle of from 30 to 60 degrees with respect to the circumferential direction of the tire.

3. The tire according to claim 2, wherein
the first inclined groove has a groove width of from 0.5 to 2.5 mm.

4. The tire according to claim 1, wherein
each inner block is provided with a second inclined groove,
the second inclined groove has an axially outer end and an axially inner end,
the axially outer end of the second inclined groove is connected to the sub lateral groove, the axially inner end of the second inclined groove is connected to one of lateral grooves, and
the second inclined groove has an inclination angle of from 30 to 60 degrees with respect to the circumferential direction of the tire.

5. The tire according to claim 4, wherein
the second inclined groove has a groove width of from 0.5 to 2.5 mm.

6. The tire according to claim 1, wherein
the tread portion has an outer portion between the tire equator and the outboard tread edge, and
the outer tread portion is provided with a circumferentially extending outer crown main groove and a circumferentially extending outer shoulder main groove disposed axially outside of the outer crown main groove.

7. A run-flat tire comprising
a tread portion having a left-right asymmetry tread pattern including an inboard tread edge and an outboard tread edge defining a tread width therebetween,
a circumferentially extending inner crown main groove disposed in an inner crown area being 20% width of the tread width from a tire equator toward the inboard tread edge,
a plurality of inner lateral grooves extending from the inner crown main groove to the inboard tread edge,
a plurality of inner blocks separated by the inner crown main groove, inner lateral grooves and the inboard tread edge, wherein
each inner block is provided with at least one narrow circumferential groove having a groove width of less than 2.0 mm,
each inner block is provided with a sub lateral groove and a slit, the sub lateral groove extending from the inboard tread edge in parallel with inner lateral grooves to an axially inner end terminating within the inner block,
the slit has an axially outer end separated from the inner end of the sub lateral groove,
the slit extends in parallel with inner lateral grooves from the axially outer end to an axially inner end terminating within the inner block, and
the slit has a width gradually reducing toward the inner crown main groove.

8. The tire according to claim 7, wherein
each inner block is provided with a plurality of narrow circumferential grooves each having a groove width of less than 1.5 mm.

9. The tire according to claim 8, wherein
said narrow circumferential grooves are disposed in an inner shoulder region having a width of 18% of the tread width from the inboard tread edge.

* * * * *